Patented Feb. 11, 1936

2,030,327

UNITED STATES PATENT OFFICE 2,030,327

WATERINSOLUBLE AZODYESTUFFS

Gerhard Schrader, Opladen, near Cologne, and Werner Zerweck, Frankfort-on-the-Main-Fechenheim, Germany, assignors to General Aniline Works, Inc., New York, N. Y., a corporation of Delaware No Drawing. Original application September 2, 1933, Serial No. 688,060. Divided and this application August 4, 1934, Serial No. 738,562. In Germany September 9, 1932

8 Claims. (Cl. 260—44.2)

The present invention relates to waterinsoluble azodyestuffs and to fibres dyed therewith, more particularly it relates to dyestuffs of the general formula:

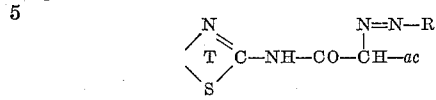

wherein T stands for the radical of a thiazole compound free from a group inducing solubility in water, such as the sulfonic or carboxylic acid group, that means T may stand for a thiazole nucleus which may bear non-solubilizing monovalent substituents, such as alkyl, alkoxy, halogen, the nitro group, the amino group, a substituted amino group, such as alkyl- or acylamino; further T may represent a thiazole nucleus to which an arylene radical is condensed, for instance, T may stand for the radical of the thiazole which is derived from an aminobenzene, aminonaphthalene, aminocarbazole, aminodiphenyleneoxide, aminodiphenylenesulfide, aminoacenaphthene, aminodibenzofurane, aminofluorene, aminocumarane, which amino compounds may bear non-solubilizing substituents, R stands for the radical of a diazotized primary amine suitable for producing an azodyestuff free from a group inducing solubility in water, for instance, for a radical of the benzene or naphthalene series free from a sulfonic or carboxylic acid group which may bear as substituent, for instance, halogen, alkyl, alkoxy, the nitro group and a substituted amino group, and wherein $ac$ stands for an acyl radical, such as an acyl of the aliphatic or aromatic series, for instance, for acetyl, propionyl, butyryl, benzoyl, chlorobenzoyl, methylbenzoyl, nitrobenzoyl and the like.

Our new dyestuffs are obtainable by diazotizing a diazotization component free from a group inducing solubility in water and coupling in substance or on a substratum, especially the vegetable fibre, with a coupling component of the general formula:

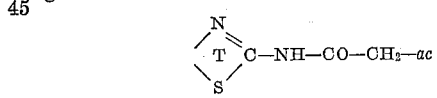

wherein T and $ac$ mean the same as stated above. The dyestuffs prepared in substance are generally yellowish to brownish substances, suitable for preparing lakes fast to light, while those produced on the fibre, especially the cellulosic fibre, according to one of the usual dyeing or printing processes, generally yield yellow to yellowish-brown shades of good fastness properties.

As is known from literature that 2-aminoarylenethiazoles may react in the imino form, we include in our invention those dyestuffs containing the coupling component in the imino form and which may be represented by the probable general formula:

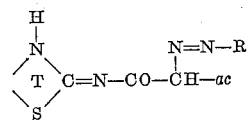

wherein the figures T, R and $ac$ mean the same as stated above.

The coupling components used in the manufacture of our new dyestuffs have been described in our parent application for Letters Patent Ser. No. 688,060, filed September 2, 1933.

The invention is illustrated by the following examples, without being limited thereto:

*Example 1.*—6 grams of 2-acetoacetylamino-6-ethoxybenzothiazole are dissolved with 5 cc. of aqueous caustic soda lye of 38° Bé. strength and 10 cc. of Turkey red oil and water to one litre. To this solution some common salt is added, and 50 grams of cotton yarn are impregnated in this bath for ½ hour. The impregnated yarn is squeezed and introduced for about ½ hour into a developing bath of one litre containing 1.42 grams of diazotized 1-amino-2-methyl-5-chlorobenzene, said developing bath having previously been neutralized by the addition of sodium acetate. The cotton yarn is rinsed, soaped in a boiling bath, rinsed again and dried. A clear yellow is thus obtained having excellent fastness properties and being dischargeable to a pure white. The dyestuff corresponds to the following formula:

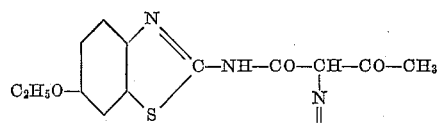
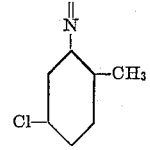

*Example 2.*—50 grams of cotton yarn are impregnated as described in Example 1. On developing in a developing bath of one litre containing 1.52 grams of diazotized 1-amino-2-nitro-4- methylbenzene, there is obtained after rinsing and soaping a reddish-yellow of good fastness properties. The dyestuff corresponds to the following formula:

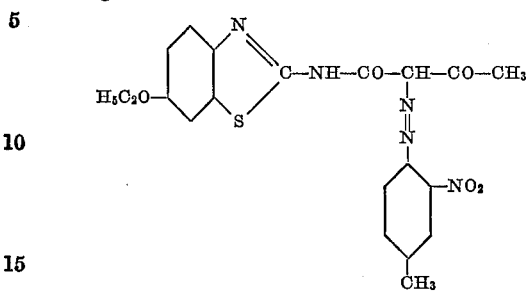

*Example 3.*—50 grams of cotton yarn are impregnated as described in Example 1. On developing in a developing bath of one litre containing 1.42 grams of diazotized 1-amino-2-methyl-4-chlorobenzene, there is obtained after rinsing and soaping a beautiful yellow which is dischargeable to a pure white. The dyestuff corresponds to the following formula:

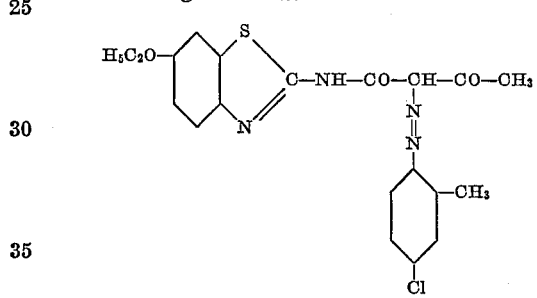

*Example 4.*—50 grams of cotton yarn are impregnated as described in Example 1. On developing in a developing bath of one litre containing 1.27 grams of diazotized 1-amino-2-chlorobenzene, there is obtained after rinsing and soaping a clear greenish-yellow of good fastness properties and good dischargeability. The dyestuff corresponds to the following formula:

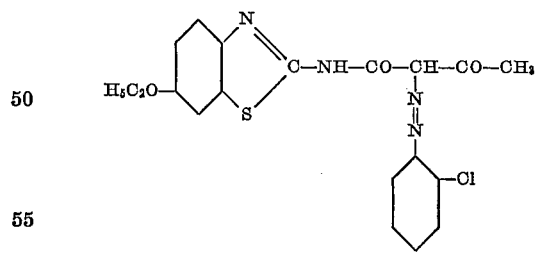

*Example 5.*—50 grams of cotton yarn are impregnated as described in Example 1. On developing in a developing bath of one litre containing 2.2 grams of diazotized 2-amino-4-chlorodiphenylether, there is obtained a clear yellow which can be discharged to a pure white. The dyestuff corresponds to the following formula:

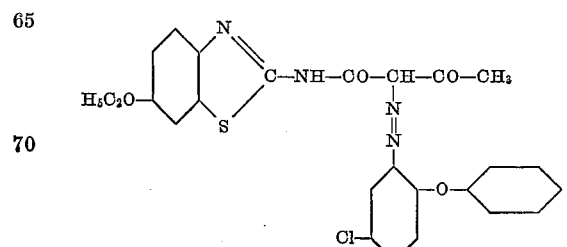

*Example 6.*—7 grams of 2-acetoacetylamino-6-methoxybenzothiazole are dissolved in the usual manner with the aid of aqueous caustic soda lye, Turkey red oil and some water, and the solution is made up with water to one litre. To the solution some Glauber's salt is added, and 50 grams of cotton yarn are impregnated in this bath for ½ hour, then rinsed and introduced for about ½ hour into a developing bath containing in one litre 1.68 grams of diazotized 1-amino-2-nitro-4-methoxybenzene. After rinsing, soaping, again rinsing and drying, there is obtained a golden-yellow of good fastness properties. The dyestuff corresponds to the following formula:

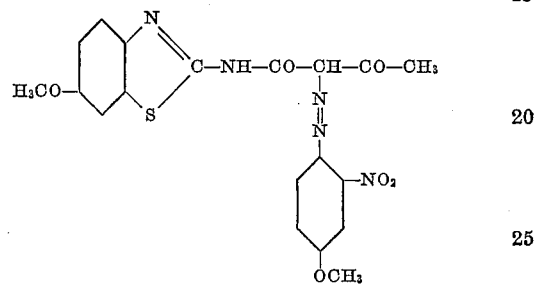

By substituting the 2 - acetoacetylamino - 6 - methoxybenzothiazole by a corresponding quantity of 2-benzoylacetylamino-6-methoxybenzothiazole, there is obtained a dyestuff having similar properties.

*Example 7.*—5 grams of 2-acetoacetylamino-6-benzoylamino-benzothiazole are dissolved in the usual manner with the aid of aqueous caustic soda lye, Turkey red oil and some water, and made up with water to one litre. To the solution some Glauber's salt is added, and 50 grams of cotton yarn are impregnated in this bath for ½ hour, then rinsed and introduced for about ½ hour into a developing bath of one litre containing 1.42 grams of diazotized 1-amino-2-methyl-4-chlorobenzene, rinsed, soaped in a boiling bath, rinsed and dried. A greenish-yellow is thus obtained which can be discharged to a pure white. The dyestuff corresponds to the following formula:

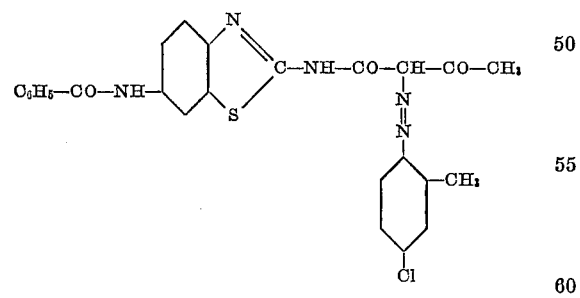

By substituting the 1-amino-2-methyl-4-chlorobenzene by 1-amino-2-methyl-5-chlorobenzene, there is obtained a dyestuff of similar properties.

*Example 8.*—34 grams of 2-benzoylacetylamino-6-ethoxybenzothiazole are dissolved in 300 grams of pyridine; thereto is added an aqueous solution containing 14.2 grams of diazotized 1-amino-2-methyl-5-chlorobenzene which has been neutralized by the addition of sodium acetate, with cooling. When the coupling is complete, the reaction liquor is poured into water, and the dyestuff which separates in form of yellow flakes is filtered. After drying, it is a reddish-yellow powder.

*Example 9.*—1.39 grams of 2-acetoacetylamino-6-ethoxybenzothiazole and 1.2 grams of the diazoamino compound from diazotized 5-chloro-2-methyl-1-aminobenzene and sarcosine are pasted with 0.7 cc. of aqueous caustic solution of 38° Bé. strength, 5 grams of neutral chromate solution and 5 grams of thiodiglycol, and the paste is dissolved in 25 cc. of water. The solution is stirred into 50 grams of neutral starch-tragacanth thickener and made up with water to 100 grams. With this paste cotton tissue is printed, the cotton is dried and the dyestuff is developed by the action of steam containing acetic or formic acid. A clear greenish-yellow is thus obtained. The dyestuff is identical with that described in Example 1.

*Example 10.*—1.39 grams of 2-acetoacetyl-amino-6-ethoxy-benzothiazole and 2.05 grams of the diazoamino compound from diazotized 4-nitro-2-methoxy-1-aminobenzene and 1-methyl-aminobenzene-2-carboxylic acid-4-sulfonic acid are pasted with 0.7 cc. of aqueous caustic soda lye of 38° Bé. strength, 5 grams of neutral chromate solution and 5 grams of thiodiglycol, and the paste is dissolved in 25 cc. of water. The solution is stirred into 50 grams of neutral starch-tragacanth thickener and made up with water to 100 grams. With this paste cotton tissue is printed, the cotton is dried, and the dyestuff is developed by the action of steam containing acetic or formic acid. A clear golden-yellow is thus obtained. The dyestuff corresponds to the following formula:

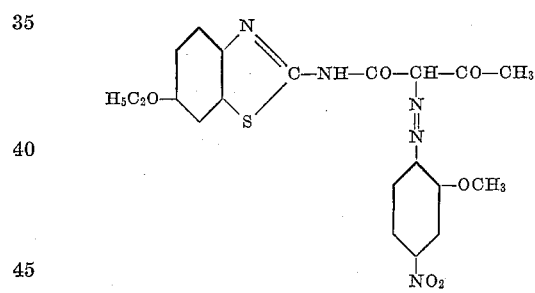

*Example 11.*—50 grams of cotton yarn are impregnated as described in Example 1. On developing in a developing bath of one litre containing 2.17 grams of diazotized 1-aminopyrene, there is obtained after rinsing, soaping, rinsing and drying, a powerful yellowish-brown. The dyestuff corresponds to the following formula:

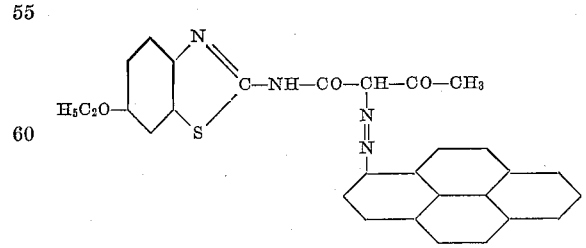

*Example 12.*—6 grams of 2-acetoacetylamino-(9'-ethyl-2',3'-carbazole)-thiazole are dissolved in hot water with 6 cc. of aqueous caustic soda lye of 38° Bé. and 6 cc. of Turkey red oil to 1 litre. Some common salt is added, and in this bath 50 grams of cotton yarn are impregnated for ½ hour. The yarn is squeezed and introduced for about ½ hour into a developing bath of one litre containing 1.42 grams of 1-amino-2-methyl-4-chlorobenzene. After rinsing, soaping in a boiling bath, again rinsing and drying, there is obtained a clear golden yellow of good fastness properties. The dyestuff corresponds to the following formula:

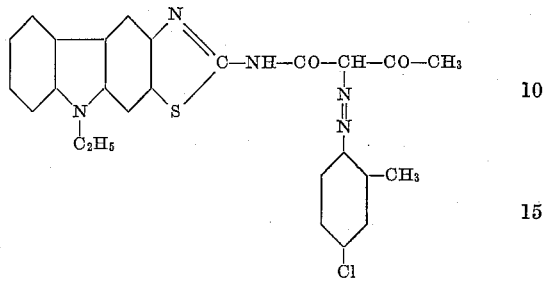

*Example 13.*—6 grams of acetoacetylamino-(3',4'-acenaphthene)-thiazole are dissolved in hot water with 5 cc. of aqueous caustic soda lye of 38° Bé. and 10 cc. of Turkey red oil to one litre. 50 grams of cotton yarn are impregnated in this solution, and the dyeing is developed by introducing for ½ hour into a developing bath containing 1.42 grams of diazotized 1-amino-2-methyl-5-chlorobenzene. After rinsing, soaping, again rinsing and drying, there is obtained an orange of good fastness properties. The dyestuff corresponds to the following formula:

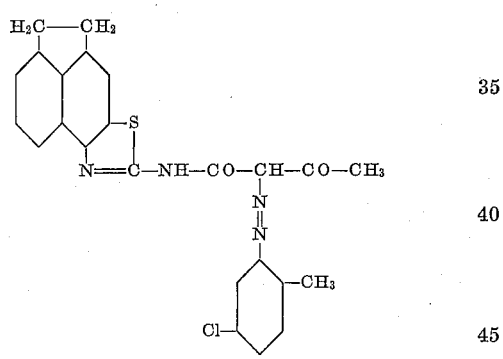

*Example 14.*—3.24 grams of the acetoacetyl compound of the formula:

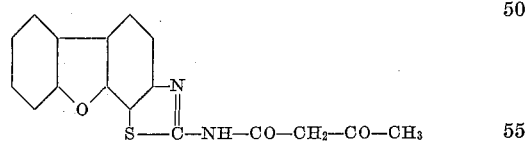

are dissolved in 50 cc. of pyridine, and thereto is added a diazo solution prepared from 1.42 grams of 1-amino-2-methyl-4-chlorobenzene. A reddish-yellow dyestuff is thus obtained suitable for dyeing lacquers.

*Example 15.*—1.42 grams of 2-acetoacetylamino-(1',2'-naphtho)-thiazole and 1.28 grams of the diazoamino compound from diazotized 4-chloro-2-methoxy-1-aminobenzene and sarcosine are made into a paste with 0.7 cc. of aqueous caustic soda lye of 38° Bé. strength, 5 grams of neutral chromate solution and 5 grams of thiodiglycol, and the paste is dissolved in 25 cc. of water. The solution is stirred into 50 grams of neutral starch-tragacanth thickener and made up with water to 100 grams. With this paste cotton tissue is printed, the cotton is dried, and the dyestuff is developed by the action of steam containing acetic acid or formic acid. A clear greenish-yellow is thus obtained. The dyestuff corresponds to the following formula:

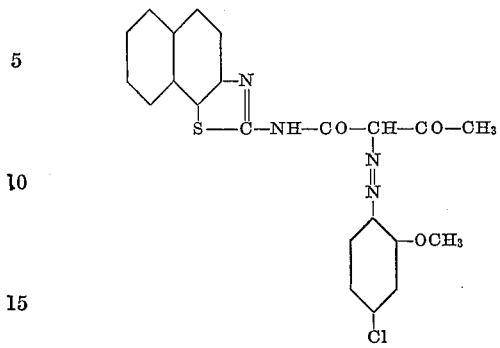

*Example 16.*—1.42 grams of 2-acetoacetylamino-(2',1'-naphtho)-thiazole and 2.05 grams of the diazoamino compound from diazotized 4-nitro-2-methoxy-1-aminobenzene and 1-methylaminobenzene-2-carboxylic acid-4-sulfonic acid, yield, when printed and developed as described in Example 15, a powerful yellow. The dyestuff corresponds to the following formula:

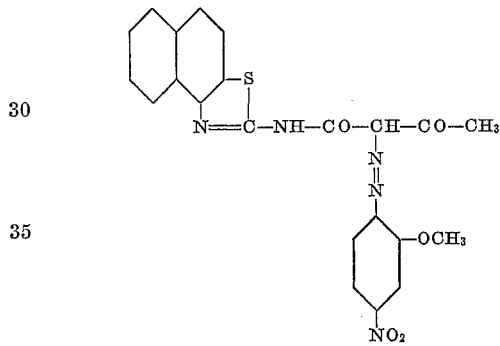

*Example 17.*—3 grams of 2-acetoacetylamino-(2',1'-naphtho)-thiazole are dissolved with 3 cc. of ethylalcohol, 4.5 cc. of aqueous caustic soda solution of 38° Bé. strength and 6 cc. of Turkey red oil in hot water to one litre. Some common salt is added to this solution, 50 grams of cotton yarn are impregnated therewith for about ½ hour, and the dyeing is developed by introducing the cotton yarn into a developing bath of one litre containing 2.6 grams of diazotized 1-methoxy-2-aminobenzene-4-sulfodiethylamide. After rinsing, soaping in a boiling bath, again rinsing and drying, there is obtained a clear greenish-yellow of excellent fastness to light. The dyestuff corresponds to the following formula:

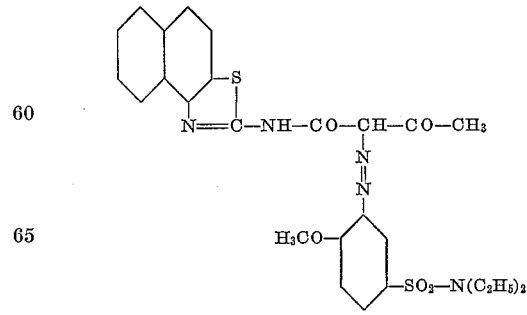

*Example 18.*—3 grams of 2-acetoacetylamino-6'-methoxy-(1',2'-naphtho)-thiazole are dissolved with 6 cc. of aqueous caustic soda lye of 38° Bé. and 6 cc. of Turkey red oil in hot water to one litre. To the solution some common salt is added, and 50 grams of cotton are impregnated in the bath for ½ hour. By developing in a developing bath of one litre, containing 2.2 grams of diazotized 4-chloro-2-amino-diphenylether, there is obtained after rinsing, soaping, again rinsing and drying a clear yellow of good fastness properties. The dyestuff corresponds to the following formula:

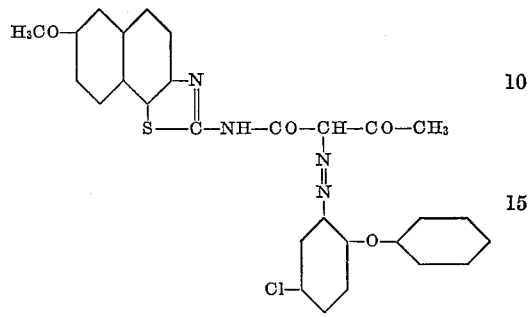

In an analogous manner the dyestuff from 2-acetoacetylamino-(1',2'-naphtho)-thiazole and diazotized 1-amino-2-nitro-4-methoxybenzene yields a clear golden-orange of very good fastness properties. The dyestuff corresponds to the following formula:

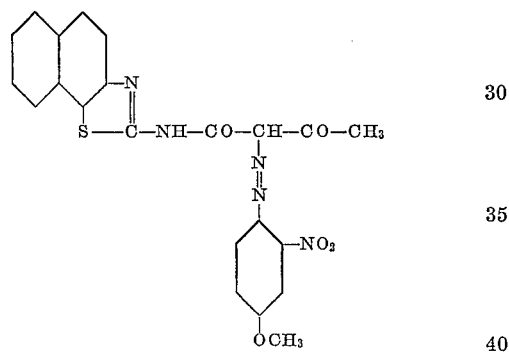

In an analogous manner the dyestuff from 2-acetoacetylamino-4-methylthiazole and diazotized 2-methoxy-4-nitro-1-aminobenzene yields a powerful reddish-yellow. The dyestuff corresponds to the following formula:

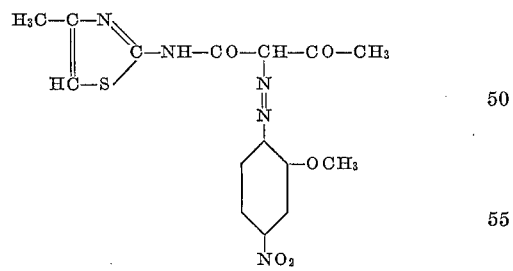

In an analogous manner 2-benzoylacetylamino-4-methylthiazole and diazotized 4-chloro-2-methyl-1-aminobenzene yield a powerful greenish-yellow of good fastness properties. The dyestuff corresponds to the following formula:

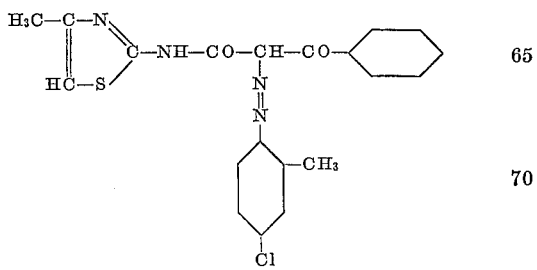

In an analogous manner 2-acetoacetylamino- 4-phenylthiazole and diazotized 4-methoxy-2-nitro-1-aminobenzene yield a golden-orange of very good fastness to light. The dyestuff corresponds to the following formula:

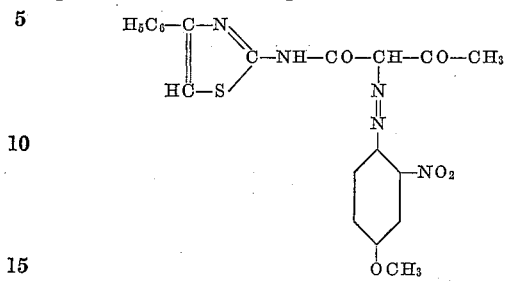

In an analogous manner 2-acetoacetylamino-4,5-diphenylthiazole and diazotized 2-methoxy-5-sulfodiethylamido-1-aminobenzene yield a greenish-yellow which can be discharged to a pure white. The dyestuff corresponds to the following formula:

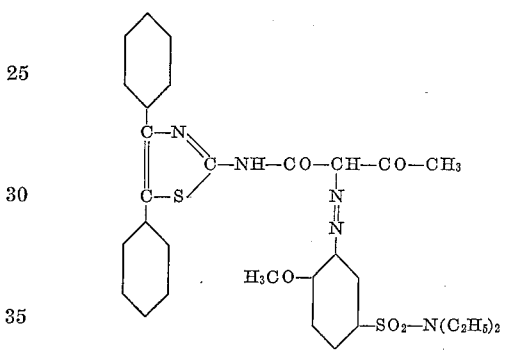

In an analogous manner 2-acetoacetylamino-4,5-diphenylthiazole and diazotized 2-chloro-5-trifluoromethyl-1-aminobenzene yield a reddish-yellow which can be discharged. The dyestuff corresponds to the following formula:

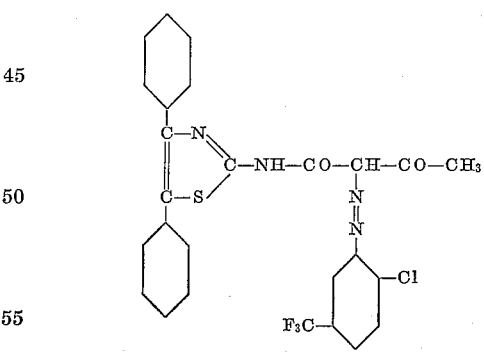

In an analogous manner 2-acetoacetylamino-6-exthoxybenzothiazole and diazotized 2-methoxy-3-aminofluorenone yield a powerful yellow. The dyestuff corresponds to to the following formula:

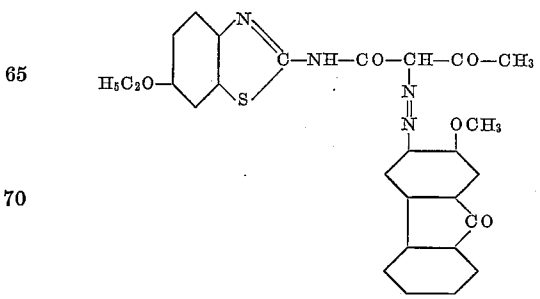

In an analogous manner 2-acetoacetylamino-6-ethoxybenzothiazole and diazotized α-naphthylamine yield a powerful yellow. The dyestuff corresponds to the following formula:

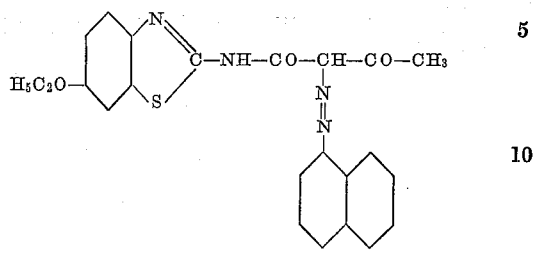

This is a division of application Serial No. 688,060, filed September 2, 1933.

We claim:

1. Waterinsoluble azodyestuffs of the general formula:

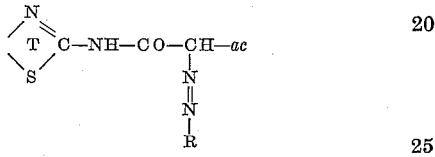

wherein T stands for the radical of a thiazole compound, ac stands for an acyl radical and R stands for the radical of a diazotized primary amine suitable for producing azodyestuffs, yielding, when produced on the fibre, generally yellow shades of good fastness properties.

2. Waterinsoluble azodyestuffs of the general formula:

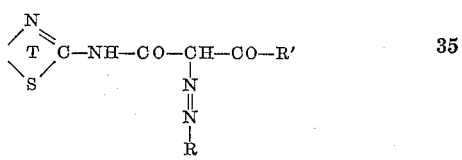

wherein T stands for the radical of a thiazole compound, R' stands for a radical of the aliphatic or aromatic series and R stands for the radical of a diazotized primary amine suitable for producing azodyestuffs, yielding, when produced on the fibre, generally yellow shades of good fastness properties.

3. Waterinsoluble azodyestuffs of the general formula:

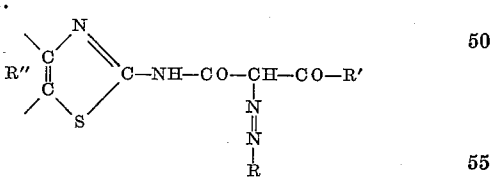

wherein R'' stands for a benzo- or naphtho-radical, R' stands for a radical of the aliphatic or aromatic series, and R stands for a radical of the benzene- or naphthalene-series, yielding, when produced on the fibre, yellow shades of good fastness properties.

4. The waterinsoluble azodyestuff of the following formula:

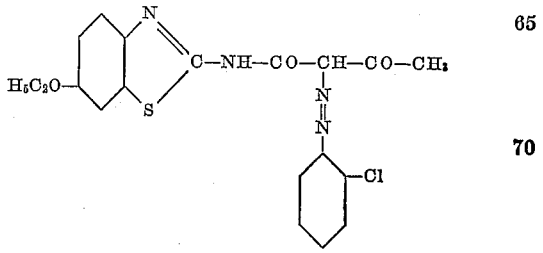

yielding, when produced on the fibre, clear greenish-yellow shades of good fastness properties and dischargeability.

5. Fibre dyed with a dyestuff as claimed in claim 1.

6. Fibre dyed with a dyestuff as claimed in claim 2.

7. Fibre dyed with a dyestuff as claimed in claim 3.

8. Fibre dyed with the dyestuff as claimed in claim 4.

GERHARD SCHRADER.
WERNER ZERWECK.